United States Patent
Seo et al.

(10) Patent No.: US 9,451,224 B2
(45) Date of Patent: Sep. 20, 2016

(54) LASER PROJECTOR AND METHOD OF COMPENSATING BRIGHTNESS OF THE SAME

(75) Inventors: Junghoon Seo, Seoul (KR); Junghwon Choi, Seoul (KR); Yongki Kim, Seoul (KR); Jaewook Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1062 days.

(21) Appl. No.: 13/033,729

(22) Filed: Feb. 24, 2011

(65) Prior Publication Data

US 2012/0120116 A1    May 17, 2012

(30) Foreign Application Priority Data

Nov. 17, 2010    (KR) .......................... 10-2010-0114248

(51) Int. Cl.
  *G09G 5/10* (2006.01)
  *H04N 9/31* (2006.01)
  *G09G 3/00* (2006.01)

(52) U.S. Cl.
  CPC ............ *H04N 9/3135* (2013.01); *G09G 3/001* (2013.01); *G09G 2320/0233* (2013.01)

(58) Field of Classification Search
  None
  See application file for complete search history.

(56) References Cited

U.S. PATENT DOCUMENTS

| | | | |
|---|---|---|---|
| 2005/0253825 A1* | 11/2005 | Kawamura et al. | 345/204 |
| 2007/0279722 A1* | 12/2007 | Yavid et al. | 359/212 |
| 2010/0201702 A1* | 8/2010 | Franik | G09G 3/001 345/589 |
| 2010/0226536 A1* | 9/2010 | Toji et al. | 382/103 |
| 2010/0309442 A1* | 12/2010 | Sadhu | G06F 1/1616 353/79 |
| 2011/0013097 A1* | 1/2011 | Freeman et al. | 348/745 |
| 2011/0317130 A1* | 12/2011 | Gollier | 353/20 |

FOREIGN PATENT DOCUMENTS

| | | |
|---|---|---|
| KR | 10-2009-0018710 A | 2/2009 |
| WO | 2009/141980 A1 | 11/2009 |

* cited by examiner

*Primary Examiner* — Ilana Spar
*Assistant Examiner* — Kirk Hermann
(74) *Attorney, Agent, or Firm* — Birch, Stewart, Kolasch & Birch, LLP

(57) ABSTRACT

A laser projector includes a drive signal generation unit for processing an input image signal to generate a laser drive signal and a scanner drive signal, a pixel position detection unit for detecting positions of pixels corresponding to a one-frame image from the generated scanner drive signal, a compensation value decision unit for deciding a brightness compensation value corresponding to the detected pixels, a compensation unit for compensating a laser drive signal corresponding to the detected pixels according to the decided brightness compensation value, a laser light source for generating laser light according to the compensated laser drive signal, and a scanner for scanning the laser light according to the scanner drive signal.

10 Claims, 11 Drawing Sheets

LASER PROJECTOR AND METHOD OF COMPENSATING BRIGHTNESS OF THE SAME

This application claims the benefit of Korean Patent Application No. 10-2010-0114248, filed on Nov. 17, 2010, which is hereby incorporated by reference as if fully set forth herein.

BACKGROUND OF THE INVENTION

1. Field of the Invention

The present invention relates to a laser projector, and more particularly, to a laser projector using a scanner and a method of compensating brightness of the same.

2. Discussion of the Related Art

Generally, a laser projector is a system that projects an input image signal on a screen using laser light emitted from a laser light source to display an image. The laser projector is mainly used as a presentation tool in conference rooms, as a projection system in theaters, and as a home theater at home.

The laser projector may include a laser light source, a light modulation unit, an optical system, a light scanner, and an image controller.

The laser light source includes a red laser to generate red light, a green laser to generate green light, and a blue laser to generate blue light.

Laser light generated from the laser light source is emitted to the light modulation unit. The light modulation unit modulates the incident laser light according to an image control signal from the image controller to generate diffracted light. The diffracted light is output to the optical system.

The diffracted light is transmitted to the light scanner via the optical system. The light scanner scans the light while rotating mirrors at predetermined angles according to a mirror control signal from the image controller to display an image.

SUMMARY OF THE INVENTION

Accordingly, the present invention is directed to a laser projector and a method of compensating brightness of the same that substantially obviate one or more problems due to limitations and disadvantages of the related art.

An object of the present invention is to provide a laser projector and a method of compensating brightness of the same that are capable of compensating brightness of an image changed depending upon motion speed of a scanner such that the brightness of the image is uniform, thereby maintaining uniformity of overall brightness of the image and reducing power consumption.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laser projector includes a drive signal generation unit for processing an input image signal to generate a laser drive signal and a scanner drive signal, a pixel position detection unit for detecting positions of pixels corresponding to a one-frame image from the generated scanner drive signal, a compensation value decision unit for deciding a brightness compensation value corresponding to the detected pixels, a compensation unit for compensating a laser drive signal corresponding to the detected pixels according to the decided brightness compensation value such that the brightness compensation value gradually increased or decreased from at least one reference pixel, among total pixels corresponding to each horizontal line of the one-frame image, to pixels remote from the at least one reference pixel, a laser light source for generating laser light according to the compensated laser drive signal, and a scanner for scanning the laser light according to the scanner drive signal.

The compensation value decision unit may include a storage unit for storing a brightness compensation value of pixels corresponding to each horizontal line of the one-frame image, a searching unit for searching a brightness compensation value corresponding to pixels detected by the pixel detection unit from the storage unit, an extraction unit for extracting the searched brightness compensation value, and a controller for controlling the searching unit and the extraction unit.

The compensation value decision unit may further include a changing unit for changing the brightness compensation value stored in the storage unit according to an external request signal.

The changing unit may include a reference pixel decision unit for deciding at least one reference pixel among total pixels corresponding to each horizontal line of the one-frame image according to an external request signal, a calculation unit for calculating a brightness compensation value gradually increased or decreased from the at least one reference pixel to pixels remote from the at least one reference pixel according to the at least one reference pixel and a predetermined functional formula for compensation, and a correction unit for correcting the brightness compensation value stored in the storage unit with the calculated brightness compensation value.

The brightness compensation value may be gradually increased to an N/2-th pixel, among total pixels of each horizontal line consisting of a first pixel to an N-th pixel, to the first pixel or is gradually decreased to the N/2-th pixel to the N-th pixel.

In another aspect of the present invention, a method of compensating brightness of a laser projector includes processing an input image signal to generate a laser drive signal and a scanner drive signal, detecting positions of pixels corresponding to a one-frame image from the scanner drive signal, deciding a brightness compensation value corresponding to the detected pixels, compensating a laser drive signal corresponding to the detected pixels according to the decided brightness compensation value such that the brightness compensation value is gradually increased or decreased from at least one reference pixel, among total pixels corresponding to each horizontal line of the one-frame image, to pixels remote from the at least one reference pixel, driving a laser light source according to the compensated laser drive signal, and driving a scanner according to the scanner drive signal to scan light from the laser light source.

The step of deciding the brightness compensation value corresponding to the detected pixels may include determining whether an external request signal to change the brightness compensation value is present, searching a brightness compensation value corresponding to the detected pixels from stored brightness compensation values upon determining that the external request signal is not present, and extracting the searched brightness compensation value.

The step of deciding the brightness compensation value corresponding to the detected pixels may further include changing the stored brightness compensation values according to the external request signal and searching a brightness compensation value corresponding to the detected pixels from the changed brightness compensation values upon determining that the external request signal is present.

The step of changing the stored brightness compensation values may include deciding at least one reference pixel among total pixels corresponding to each horizontal line of the one-frame image according to the external request signal, calculating a brightness compensation value gradually increased or decreased from the at least one reference pixel to pixels remote from the at least one reference pixel according to the at least one reference pixel and a predetermined functional formula for compensation, and correcting the stored brightness compensation values with the calculated brightness compensation value.

The brightness compensation value may be calculated, using the at least one reference pixel and a predetermined functional formula for compensation, and established as a default value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention relates to a subminiature laser projector which is applicable to mobile phones. Also, the present invention relates to a method of compensating change in brightness of an image based on motion speed of a scanner to compensate an output image such that the output image has uniform brightness and to reduce a difference between left and right components of brightness of the image, thereby reducing power consumption.

Generally, in a projector using a scanner mirror, speed of laser light may be changed according to motion of a scanner.

This means that an amount of irradiated laser light is changed according to the position of the scanner mirror.

That is, left and right end regions of an image which is displayed are relatively bright, whereas a middle region of the image is relatively dark.

Figure 1:
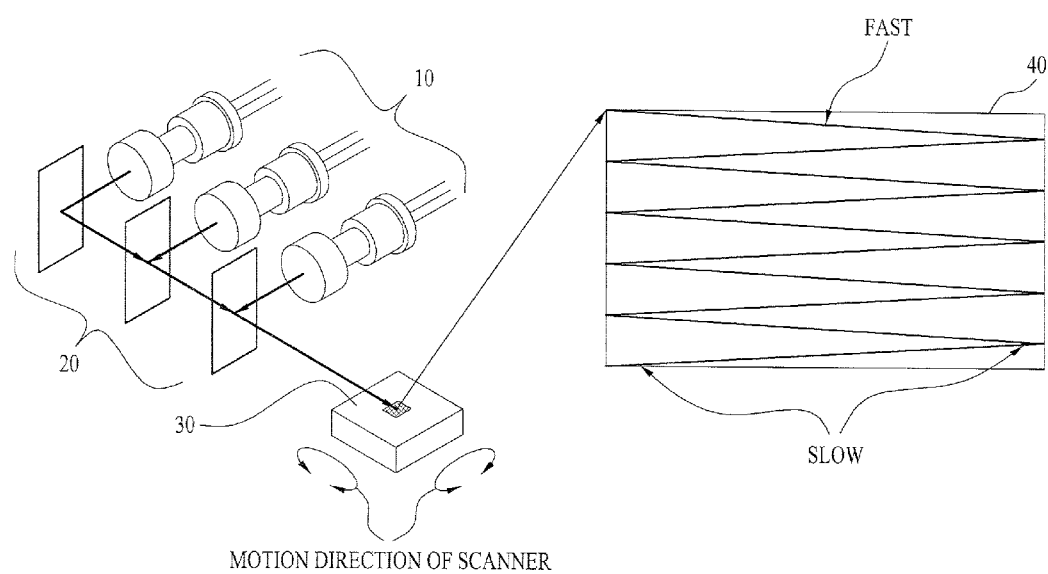
FIG. 1 is a view illustrating the change in motion speed of a scanner.

FIG. 1 is a view illustrating the change in motion speed of a scanner.

As shown in FIG. 1, laser beams generated from a light source 10 including a red light source, a green light source, and a blue light source are combined by a color combiner 20. A scanner mirror 30 displays the combined laser beams on a screen as a two-dimensional image.

The scanner mirror 30 performs a sine motion in the horizontal direction. When the scanner mirror 30 moves along each horizontal line of a one-frame image, the motion speed of the scanner mirror 30 may be slow at left and right end regions of each horizontal line, whereas the motion speed of the scanner mirror 30 may be fast at a middle region of each horizontal line.

Due to a difference between motion speeds, laser light scanning time is long at the left and right end regions of each horizontal line, with the result that a bright image may be displayed, whereas laser light scanning time is short at the middle region of each horizontal line, with the result that a dark image may be displayed.

Figure 2:
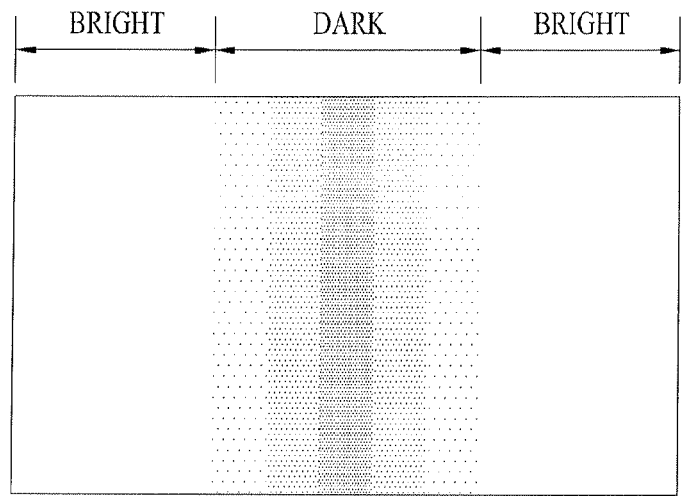
FIG. 2 is a view illustrating the change in brightness of an image based on the change in motion speed of the scanner.

FIG. 2 is a view illustrating the change in brightness of an image based on the change in motion speed of the scanner.

As shown in FIG. 2, brightness is gradually increased from a middle region to each edge region of a one-frame image displayed on a screen.

Referring to FIG. 2, brightness is the lowest at the middle region of the displayed image since motion speed of the scanner is the highest at the middle region of the displayed image. If the motion speed of the scanner is increased at a region of the image different from the middle region of the image due to external environmental fluctuation, however, brightness may be the lowest at the corresponding region of the image.

Figure 3:
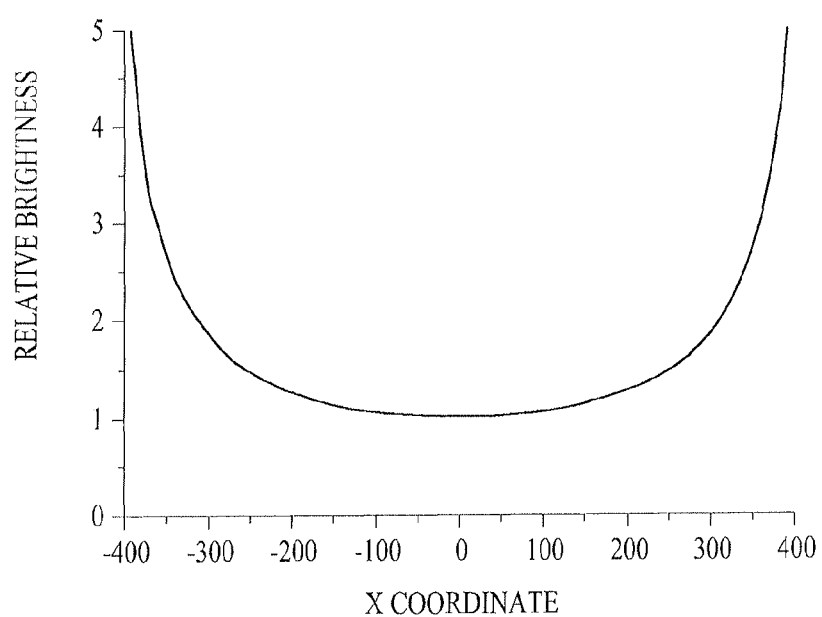
FIG. 3 is a graph illustrating relative brightness based on a horizontal motion of the scanner.

FIG. 3 is a graph illustrating relative brightness based on a horizontal motion of the scanner.

As shown in FIG. 3, when relative brightness at various positions via which horizontal motion of the scanner is performed on the basis of a reference position via which horizontal motion of the scanner is performed is measured, it can be seen that as the scanner moves away from the reference position, the relative brightness is increased in geometrical progression.

That is, FIG. 3 shows relative brightness on an X coordinate at which brightness at the middle region is 1.

According to an image signal, a scanner projector must display an image with corresponding brightness. Due to drive properties of the scanner, however, the image is not displayed in a state in which brightness of the image is uniform.

Therefore, it is possible for the present invention to relatively reduce brightness at a bright region of an image based on brightness at the darkest region of the image, thereby compensating the image such that brightness is uniform throughout the image.

Figure 4:
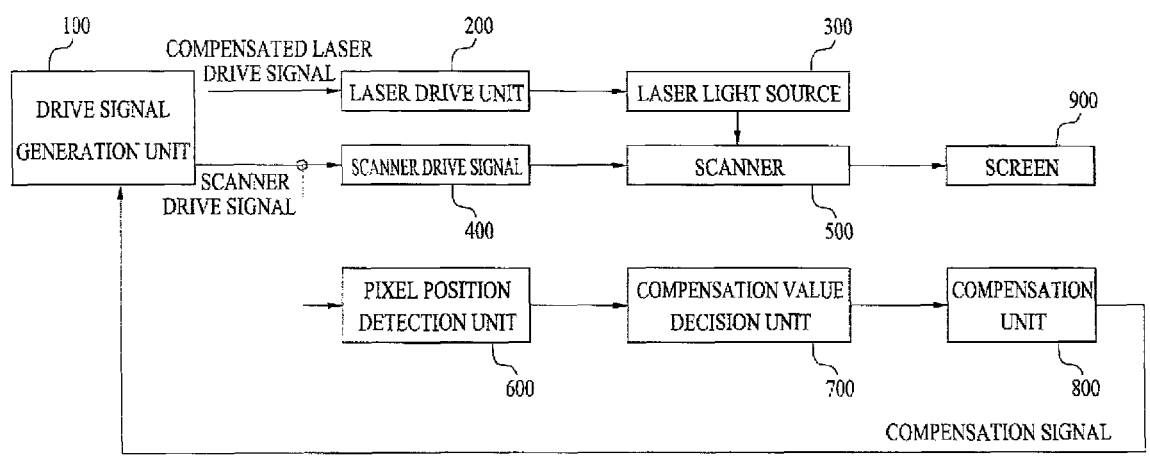
FIG. 4 is a block diagram illustrating a scanner projector according to the present invention.

FIG. 4 is a block diagram illustrating a scanner projector according to the present invention.

As shown in FIG. 4, the scanner projector includes a drive signal generation unit 100, a laser drive unit 200, a laser light source 300, a scanner drive unit 400, a scanner 500, a pixel position detection unit 600, a compensation value decision unit 700, and a compensation unit 800.

The drive signal generation unit 100 receives an image signal output from an image signal output device, such as a personal computer (PC) or an audio and video (AV) system, and processes the received image signal to generate a laser drive signal to red, green, and blue laser light sources and a scanner drive signal.

The laser drive signal may include red, green, and blue video signals, a horizontal synchronization signal, and a vertical synchronization signal. The scanner drive signal may include horizontal and vertical scanner drive signals generated using the horizontal synchronization signal and the vertical synchronization signal of the laser drive signal.

According to the received laser drive signal, the laser drive unit 200 generates voltage or current necessary to drive the laser light source 300, including the red light source, the green light source, and the blue light source. The laser light source 300 generates laser light at a level corresponding to the applied voltage or current value.

The scanner drive unit 400 includes a sine wave generation circuit, a chopping wave generation circuit, and a signal synthesis circuit. According to the received scanner drive signal, the scanner drive unit 400 generates a drive frequency necessary to drive the scanner 500. According to horizontal and vertical drive frequencies, the scanner 500 is driven horizontally and vertically to scan laser light to the screen 900 such that an image is displayed on the screen 900.

As previously described, however, the drive speed of the scanner 500 moving along each horizontal line of a one-frame image is changed, with the result that brightness of the displayed image is not uniform.

According to the present invention, the laser drive signal generated by the drive signal generation unit 100 is compensated using the pixel position detection unit 600, the compensation value decision unit 700, and the compensation unit 800 such that brightness of the displayed image is uniform.

The pixel position detection unit 600 detects the positions of pixels corresponding to a one-frame image from the generated scanner drive signal.

That is, the pixel position detection unit 600 detects positions of current pixels of an image to be displayed to the screen 900.

The compensation value decision unit 700 decides a brightness compensation value of the detected pixels.

Figure 5:
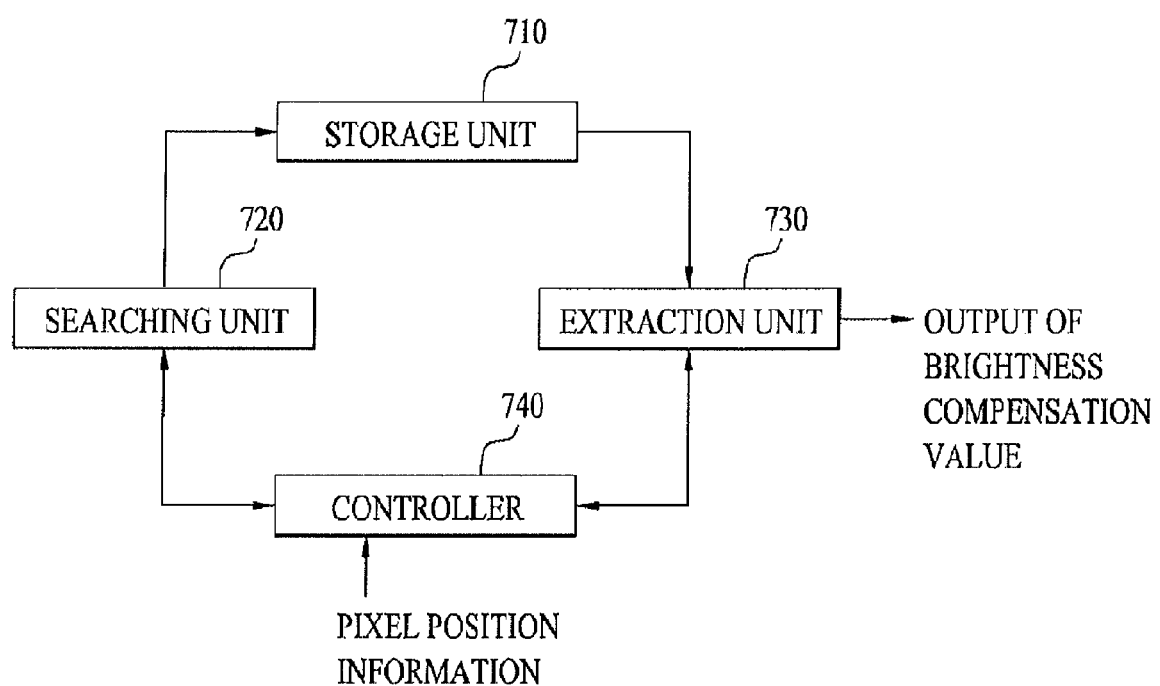
FIG. 5 is a block diagram illustrating a compensation value decision unit of FIG. 4.

FIG. 5 is a block diagram illustrating the compensation value decision unit of FIG. 4

As shown in FIG. 5, the compensation value decision unit includes a storage unit 710, a searching unit 720, an extraction unit 730, and a controller 740.

The storage unit 710 stores a brightness compensation value of pixels corresponding to each horizontal line of a one-frame image.

The brightness compensation value is a value to compensate an original brightness value of each pixel included in an image signal.

That is, the brightness compensation value is obtained by calculating brightness compensation values of the respective pixels corresponding to a frame using a predetermined functional formula for compensation so as to compensate brightness distortion of an image depending upon change in drive speed of the scanner.

In an embodiment, the brightness compensation value may be established such that, on the assumption that each horizontal line includes a first pixel to an N-th pixel, the brightness compensation value is gradually increased to an N/2-th pixel to the first pixel or the brightness compensation value is gradually decreased to the N/2-th pixel to the N-th pixel.

The brightness compensation value may be increased in geometrical progression from the N/2-th pixel to the first pixel or the brightness compensation value may be decreased in geometrical progression from the N/2-th pixel to the N-th pixel.

That is, the brightness compensation value may be increased or decreased in proportion to scanning speed of the scanner.

A method of calculating a brightness compensation value using a functional formula for compensation is as follows.

First, brightness of an image may be inversely proportional to scanning speed of laser light scanned on the screen.

If the scanning speed of the laser light is high, the brightness of the image may be decreased.

The scanning speed of the laser light is changed depending upon positions of the screen, and therefore, it is necessary to uniformly compensate the brightness of the image.

Consequently, image distortion functions X and Y may be changed based on time t as represented by Equation 1 below so as to obtain a scanning speed value of the laser light.

$$\text{Brightness/area} \propto 1/\text{scanning speed} \propto 1/(\partial X/\partial t \, \partial Y/\partial t) \qquad \text{Equation 1}$$

Since time t is proportional to input coordinates x and y, Equation 1 above may be expressed in the form of Equation 2 below.

$$\text{Brightness/area} \propto 1/(\partial^2 X/(\partial x * \partial y) \partial^2 Y/(\partial x * \partial y)) \qquad \text{Equation 2}$$

As shown in the graph of FIG. 3, relative brightness of a specific area is gradually increased from the middle region of X coordinate having a relative brightness of 1 to opposite end regions of X coordinate.

Therefore, a uniform compensation function U to uniformly compensate brightness may be defined as represented by Equation 3 below.

$$U \propto 1/(\text{brightness/area}) \propto \partial^2 X/(\partial x * \partial y) \partial^2 Y/(\partial x * \partial y)$$

$$U = (\partial^2 X/(\partial x * \partial y) \partial^2 Y/(\partial x * \partial y))/\text{Max}(\partial^2 X/(\partial x * \partial y) \partial^2 Y/(\partial x * \partial y)) \qquad \text{Equation 3}$$

That is, the brightness compensation value may be a reciprocal of a predetermined relative brightness value of each pixel.

Figure 6:
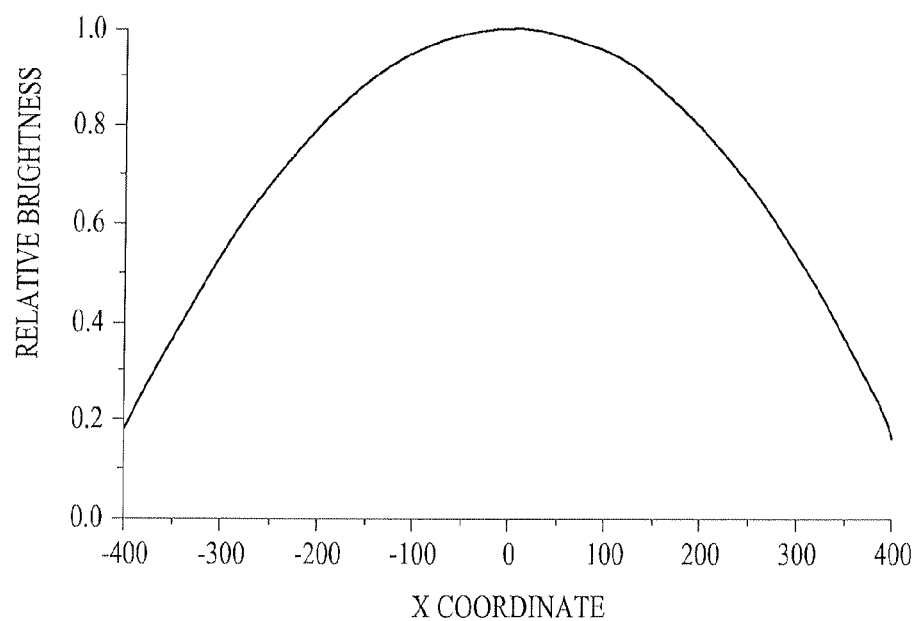
FIG. 6 is a graph illustrating a uniform compensation function according to the present invention.

FIG. 6 is a graph illustrating a uniform compensation function according to the present invention.

As shown in FIG. 6, relative brightness is gradually increased from the middle region of X coordinate having a relative brightness of 1 to opposite end regions of X coordinate.

That is, the brightness compensation value of FIG. 6 may be a reciprocal of a predetermined relative brightness value of each pixel as shown in the graph of FIG. 3.

Meanwhile, the searching unit 720 of FIG. 5 searches a brightness compensation value corresponding to pixels detected by the pixel detection unit 600 from the storage unit 710 according to a control signal from the controller 740.

The extraction unit 730 extracts the searched brightness compensation value from the storage unit 710 and outputs the extracted brightness compensation value according to a control signal from the controller 740.

The controller 740 controls the searching unit 720 and the extraction unit 730 according to position information of the pixels detected by the pixel detection unit 600.

In another embodiment, the compensation value decision unit 700 may further include a changing unit for changing the brightness compensation value stored in the storage unit 710 according to an external request signal.

Figure 7:
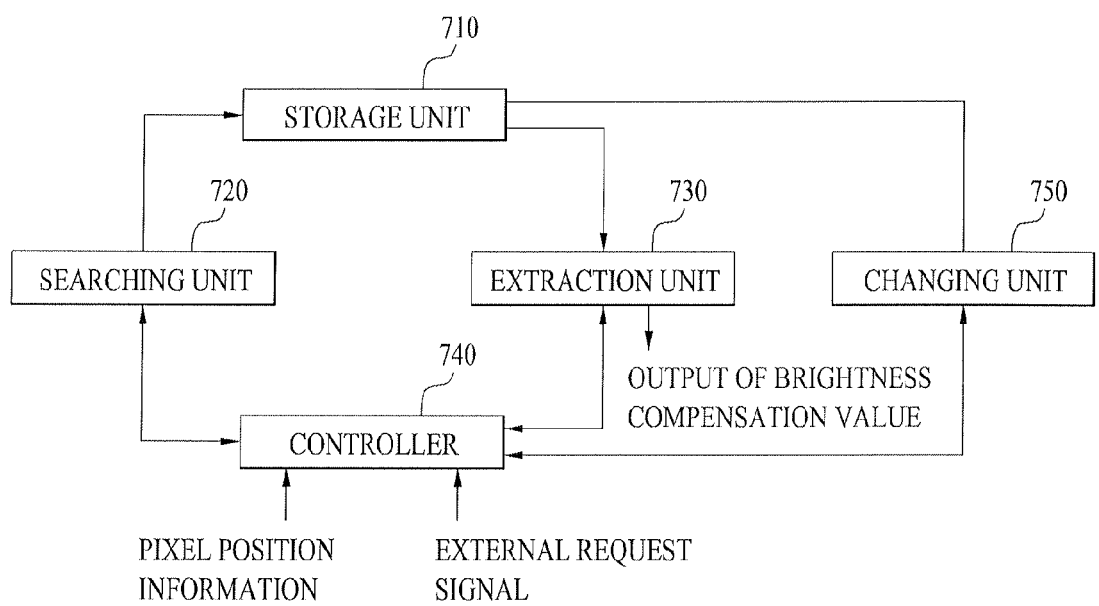
FIG. 7 is a block diagram illustrating another embodiment of the compensation value decision unit of FIG. 4.

FIG. 7 is a block diagram illustrating another embodiment of the compensation value decision unit of FIG. 4.

As shown in FIG. 7, the compensation value decision unit includes a storage unit 710, a searching unit 720, an extraction unit 730, a controller 740, and a changing unit 750.

When a user wishes to change a stored brightness compensation value, the changing unit 750 changes the brightness compensation value stored in the storage unit 710 according to a control signal from the controller 740.

For example, when the drive speed of the scanner is additionally changed due to change of external environment, brightness of an image may be additionally changed.

In this case, it may be difficult to compensate the image such that brightness of the image is uniform even though a laser drive signal is compensated using a predetermined brightness compensation value.

Consequently, a user may additionally compensate the brightness compensation value stored in the storage unit 710 through the changing unit 750 of the compensation value decision unit 700.

Figure 8:
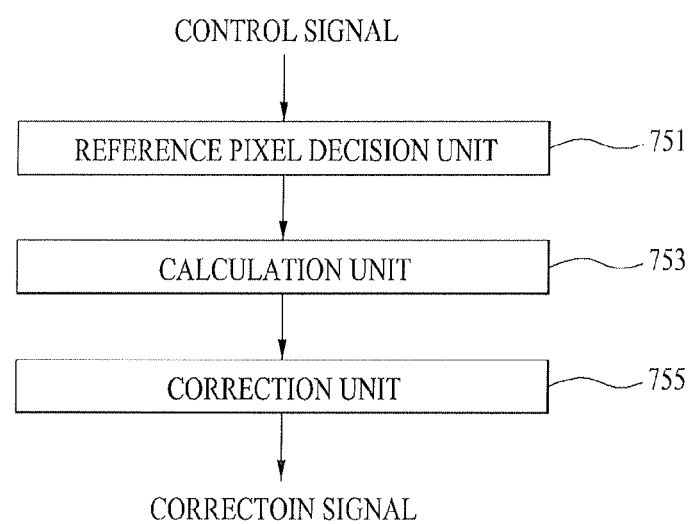
FIG. 8 is a block diagram illustrating a changing unit of FIG. 7.

FIG. 8 is a block diagram illustrating the changing unit of FIG. 7.

As shown in FIG. 8, the changing unit 750 includes a reference pixel decision unit 751, a calculation unit 753, and a correction unit 755.

The reference pixel decision unit 751 decides at least one reference pixel among total pixels corresponding to each horizontal line of a one-frame image according to an external request signal.

The reference pixel may be predetermined as a default value or may be directly established by a user.

For example, when the drive speed of the scanner is additionally changed due to change of external environment, brightness of an image may be additionally changed.

In the additionally changed image, the darkest portion is shifted from the middle region of the image to another region of the image. Therefore, it is necessary to reestablish a pixel located at the darkest portion as a reference pixel.

When the reference pixel is reestablished, relative brightness of pixels remote from the reestablished reference pixel is changed.

Therefore, the changing unit 750 compensates a brightness compensation value based on the changed relative brightness.

The controller 740 controls the changing unit 750 according to an external request signal. The changing unit 740 drives the reference pixel decision unit 751 according to a control signal from the controller 740 such that the existing reference pixel is reestablished as a new reference pixel.

For example, a reference pixel stored as a default value may be an N/2-th pixel among total pixels of each horizontal line consisting of a first pixel to an N-th pixel. A reference pixel directly established by a user may be an N−1/2-th pixel or an N+1/2-th pixel among total pixels of each horizontal line consisting of a first pixel to an N-th pixel.

According to the decided reference pixel and a predetermined functional formula for compensation, the calculation unit 753 calculates a brightness compensation value gradually increased or decreased from the reference pixel to pixels remote from the reference pixel.

Here, the predetermined functional formula for compensation is the same as Equation 3, which was previously described.

The correction unit 755 corrects the brightness compensation value stored in the storage unit 710 with a brightness compensation value calculated by the calculation unit 753.

The compensation value decision unit 700 decides a brightness compensation value corresponding to the detected pixel through the above process.

The compensation unit 800 generates a compensation signal to compensate a laser drive signal corresponding to the detected pixel according to the decided brightness compensation value such that the brightness compensation value is gradually increased or decreased at pixels remote from at least one reference pixel among total pixels corresponding to each horizontal line of a one-frame image.

The compensation signal generated by the compensation unit 800 is output to the drive signal generation unit 100. The drive signal generation unit 100 generates a laser drive signal compensated according to the compensation signal.

According to the compensated laser drive signal, the laser drive unit 200 drives the laser light source 300 such that the laser light source 300 generates compensated laser light.

The scanner 500 scans the compensated laser light on the screen 900. Consequently, it is possible to provide an image having uniform brightness in which brightness distortion of the image depending upon change in speed of the scanner 500 is compensated.

Hereinafter, a method of compensating brightness of the laser projector with the above-stated construction according to the present invention will be described.

Figure 9:
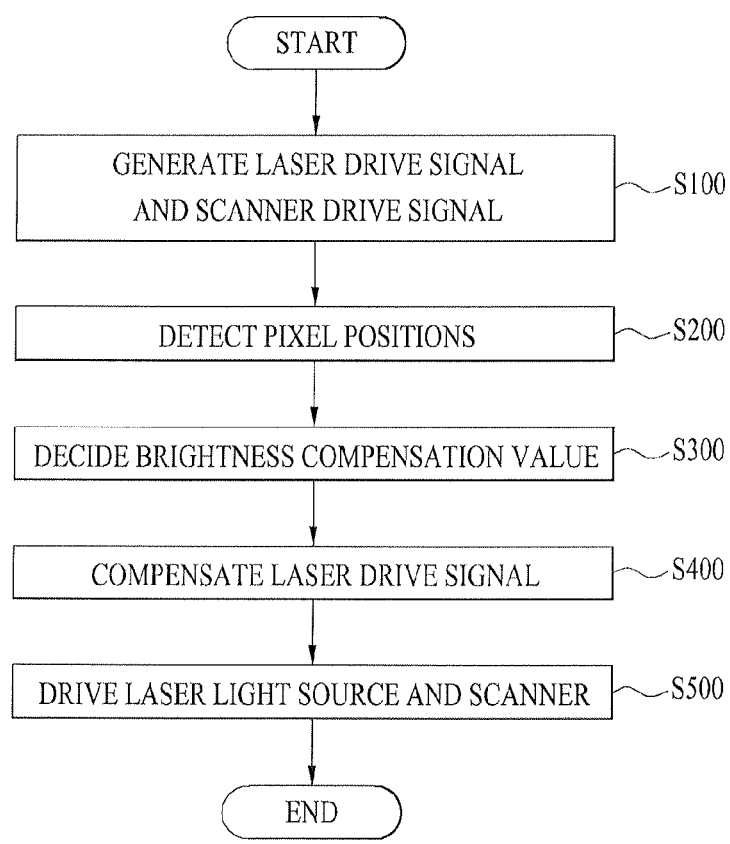
FIG. 9 is a flow chart illustrating a method of compensating brightness of a laser projector according to the present invention.

FIG. 9 is a flow chart illustrating a method of compensating brightness of the laser projector according to the present invention.

As shown in FIG. 9, when an image signal is input to the drive signal generation unit 100, the drive signal generation unit 100 processes the input image signal to generate a laser drive signal and a scanner drive signal (S100).

Subsequently, the pixel position detection unit 600 detects positions of pixels corresponding to a one-frame image from the scanner drive signal (S200).

Subsequently, the compensation value decision unit 700 decides a brightness compensation value corresponding to the detected pixels (S300).

Figure 10:
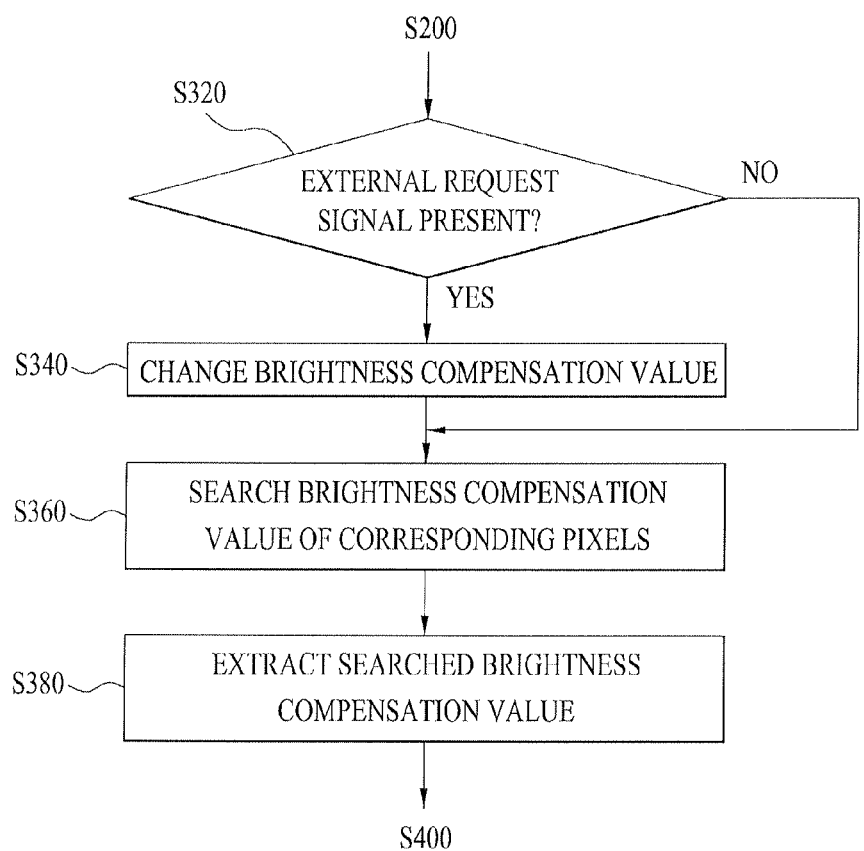
FIG. 10 is a flow chart illustrating a compensation value decision method of FIG. 9.

FIG. 10 is a flow chart illustrating a compensation value decision method of FIG. 9.

As shown in FIG. 10, the controller 740 of the compensation value decision unit 700 determines whether an external request signal to change a brightness compensation value is present (S320).

Upon determining that the external request signal to change the brightness compensation value is not present, the searching unit 720 searches a brightness compensation value corresponding to the detected pixels from the storage unit 710 according to a control signal from the controller 740 (S360).

The extraction unit 730 extracts a brightness compensation value corresponding to the detected pixels from the storage unit 710 and outputs the extracted brightness compensation value according to a control signal from the controller 740 (S380).

On the other hand, upon determining that the external request signal to change the brightness compensation value is present, the controller 740 controls the changing unit 750, and the changing unit 750 changes a brightness compensation value stored in the storage unit 710 according to a control signal from the controller 740 (S340).

Figure 11:
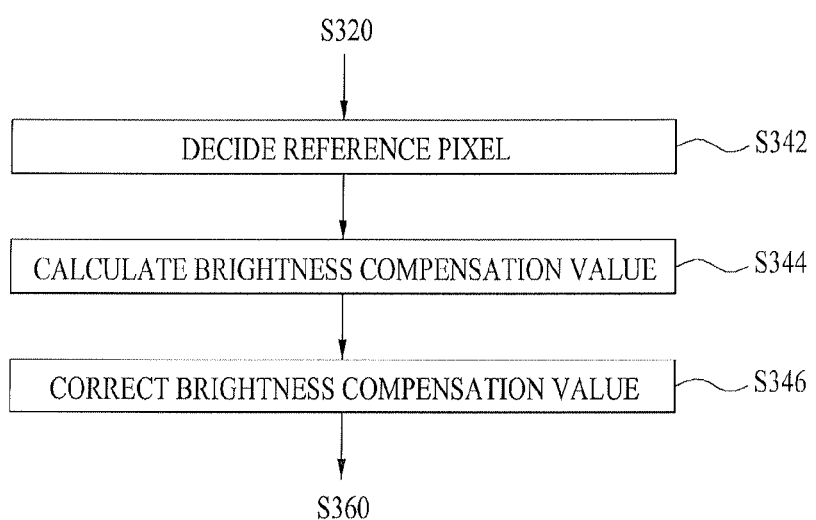
FIG. 11 is a flow chart illustrating a compensation value changing method of FIG. 10.

FIG. 11 is a flow chart illustrating a compensation value changing method of FIG. 10.

As shown in FIG. 11, upon determining that the external request signal to change the brightness compensation value is present, the controller 740 of the compensation value decision unit 700 controls the reference pixel decision unit 751.

The reference pixel decision unit 751 decides at least one reference pixel among total pixels corresponding to each horizontal line of a one-frame image (S342).

Subsequently, according to the decided reference pixel and a predetermined functional formula for compensation, the calculation unit 753 calculates a brightness compensation value gradually increased or decreased from the reference pixel to pixels remote from the reference pixel (S344).

Subsequently, the correction unit 755 corrects the stored brightness compensation value with the calculated brightness compensation value (S346).

The brightness compensation value may be changed through the above process. The brightness compensation value may be calculated using a predetermined reference pixel and a predetermined functional formula for compensation and then may be established as a default value.

Here, the predetermined reference pixel may be an N/2-th pixel among total pixels of each horizontal line consisting of a first pixel to an N-th pixel.

The brightness compensation value may be increased or decreased from the reference pixel of each horizontal line to pixels remote from the reference pixel in geometrical progression.

Upon deciding the brightness compensation value, the compensation unit 800 generates a compensation signal to compensate a laser drive signal corresponding to the detected pixel (S400).

That is, the compensation unit 800 compensates the laser drive signal such that the brightness compensation value is gradually increased or decreased at pixels remote from at least one reference pixel among total pixels corresponding to each horizontal line of a one-frame image.

Subsequently, the drive signal generation unit 100 generates and outputs a laser drive signal compensated according to the compensation signal.

Subsequently, the laser drive unit 200 drives the laser light source 300 according to the compensated laser drive signal, and the scanner drive unit 400 drives the scanner 500 according to a scanner drive signal (S500).

The scanner 500 scans laser light in which image distortion due to change of brightness is compensated on the screen 900 to display an image having uniform brightness.

The brightness of an image displayed on the screen is not uniform depending upon change in drive speed of the scanner, and therefore, it is necessary to uniformly compensate the brightness of the image.

Consequently, image distortion functions X and Y may be changed based on time t as represented by Equation 1 below so as to obtain a scanning speed value of the laser light.

$$\text{Brightness/area} \propto 1/\text{scanning speed} \propto 1/(\partial x/\partial t \partial y/\partial t) \qquad \text{Equation 1}$$

Since time t is proportional to input coordinates x and y, Equation 1 above may be expressed in the form of Equation 2 below.

$$\text{Brightness/area} \propto 1/(\partial^2 X/(\partial x * \partial y) \partial^2 Y/(\partial x * \partial y)) \qquad \text{Equation 2}$$

A uniform compensation function U to uniformly compensate brightness may be defined as represented by Equation 3 below.

$$U \propto 1/(\text{brightness/area}) \propto \partial^2 X/(\partial x * \partial y) \partial^2 Y/(\partial x * \partial y)$$

$$U = (\partial^2 X/(\partial x * \partial y) \partial^2 Y/(\partial x * \partial y))/\text{Max}(\partial^2 X/(\partial x * \partial y) \partial^2 Y/(\partial x * \partial y)) \qquad \text{Equation 3}$$

The present invention generates a brightness compensation value using such a functional formula for compensation and compensates a laser drive signal using the generated brightness compensation value to provide an image having uniform brightness.

The brightness compensation value is decided based on the reference pixel in the darkest region, and therefore, it is possible to maintain uniformity of overall brightness of an image and to reduce power consumption.

Also, according to the present invention, a user arbitrarily changes a brightness compensation value to control brightness of the image and power consumption according to the changed brightness compensation value, and therefore, it is possible to improve user satisfaction.

When the laser projector according to the present invention is applied to products, such as mobile phones, the laser projector can be driven at low power consumption, and therefore, use time of the laser projector is improved.

As is apparent from the above description, the laser projector and the method of compensating brightness of the same according to the present invention have the following effects.

Brightness of an image changed depending upon motion speed of the scanner is compensated such that the brightness of the image is uniform. Consequently, it is possible to maintain uniformity of overall brightness of the image and to reduce power consumption.

Also, a user can arbitrarily change a brightness compensation value to control brightness of the image and power consumption according to the changed brightness compensation value. Consequently, it is possible to improve user satisfaction.

The features, structures, and effects described in the above embodiments are included in at least one embodiment of the present invention, which, however, is not limited to only one embodiment. In addition, the features, structures, and effects illustrated in the respective embodiments may be embodied in a combined or modified manner in other embodiments by those skilled in the art. Thus, it is intended that such combination and modification are within the scope of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A laser projector comprising:
   a drive signal generation unit for processing an input image signal to generate a laser drive signal and a scanner drive signal;

a pixel position detection unit for detecting positions of pixels corresponding to a one-frame image from the generated scanner drive signal;

a compensation value decision unit for deciding a brightness compensation value corresponding to the detected pixels;

a compensation unit for compensating a laser drive signal corresponding to the detected pixels according to the decided brightness compensation value such that the brightness compensation value gradually increased or decreased from at least one reference pixel, among total pixels corresponding to each horizontal line of the one-frame image, to pixels remote from the at least one reference pixel;

a laser light source for generating laser light according to the compensated laser drive signal; and a scanner for scanning the laser light according to the scanner drive signal, wherein the reference pixel is located at the darkest portion among total pixels corresponding to a horizontal line of the one-frame image, wherein when a scanning of the scanner moves along the horizontal line of the one-frame image, a scanning speed of the scanner is gradually decreased in a direction of the reference pixel from a first pixel among total pixels corresponding to the horizontal line, and is gradually increased in a direction of a last pixel among total pixels corresponding to the horizontal line from the reference pixel, and wherein when the darkest portion is shifted from a first region of the one-frame image to a second region of the one-frame image, the reference pixel is reestablished from a first pixel located in the first region of the one-frame image to a second pixel in the second region of the one-frame image.

2. The laser projector according to claim 1, wherein the compensation value decision unit comprises:

a storage unit for storing a brightness compensation value of pixels corresponding to each horizontal line of the one-frame image;

a searching unit for searching a brightness compensation value corresponding to pixels detected by the pixel detection unit from the storage unit;

an extraction unit for extracting the searched brightness compensation value; and a controller for controlling the searching unit and the extraction unit.

3. The laser projector according to claim 1, wherein the brightness compensation value is gradually increased to an N/2-th pixel, among total pixels of each horizontal line consisting of a first pixel to an N-th pixel, to the first pixel or is gradually decreased to the N/2-th pixel to the N-th pixel.

4. The laser projector according to claim 1, wherein the brightness compensation value is increased or decreased from the at least one reference pixel of each horizontal line to pixels remote from the at least one reference pixel in geometrical progression.

5. The laser projector according to claim 1, wherein the at least one reference pixel is predetermined as a default value or is directly established by a user.

6. The laser projector according to claim 1, wherein the at least one reference pixel is an N/2-th pixel among total pixels of each horizontal line consisting of a first pixel to an N-th pixel.

7. A method of compensating brightness of a laser projector comprising:

processing an input image signal to generate a laser drive signal and a scanner drive signal;

detecting positions of pixels corresponding to a one-frame image from the scanner drive signal;

deciding a brightness compensation value corresponding to the detected pixels;

compensating a laser drive signal corresponding to the detected pixels according to the decided brightness compensation value such that the brightness compensation value is gradually increased or decreased from at least one reference pixel, among total pixels corresponding to each horizontal line of the one-frame image, to pixels remote from the at least one reference pixel;

driving a laser light source according to the compensated laser drive signal; and driving a scanner according to the scanner drive signal to scan light from the laser light source, wherein the reference pixel is located at the darkest portion among total pixels corresponding to a horizontal line of the one-frame image, wherein when a scanning of the scanner moves along the horizontal line of the one-frame image, a scanning speed of the scanner is gradually decreased in a direction of the reference pixel from a first pixel among total pixels corresponding to the horizontal line, and is gradually increased in a direction of a last pixel among total pixels corresponding to the horizontal line from the reference pixel, and wherein when the darkest portion is shifted from a first region of the one-frame image to a second region of the one-frame image, the reference pixel is reestablished from a first pixel located in the first region of the one-frame image to a second pixel in the second region of the one-frame image.

8. The method according to claim 7, wherein the brightness compensation value is calculated, using the at least one reference pixel and a predetermined functional formula for compensation, and established as a default value.

9. The method according to claim 8, wherein the at least one reference pixel is an N/2-th pixel among total pixels of each horizontal line consisting of a first pixel to an N-th pixel.

10. The method according to claim 8, wherein the brightness compensation value is increased or decreased from the at least one reference pixel of each horizontal line to pixels remote from the at least one reference pixel in geometrical progression.

* * * * *